Feb. 9, 1932.   E. S. NELSON   1,844,786
MULTIHELIX
Filed Jan. 6, 1930   2 Sheets-Sheet 1

INVENTOR.
ERIK S. NELSON.
BY Munn + Co.
ATTORNEYS.

Feb. 9, 1932. E. S. NELSON 1,844,786
MULTIHELIX
Filed Jan. 6, 1930 2 Sheets-Sheet 2
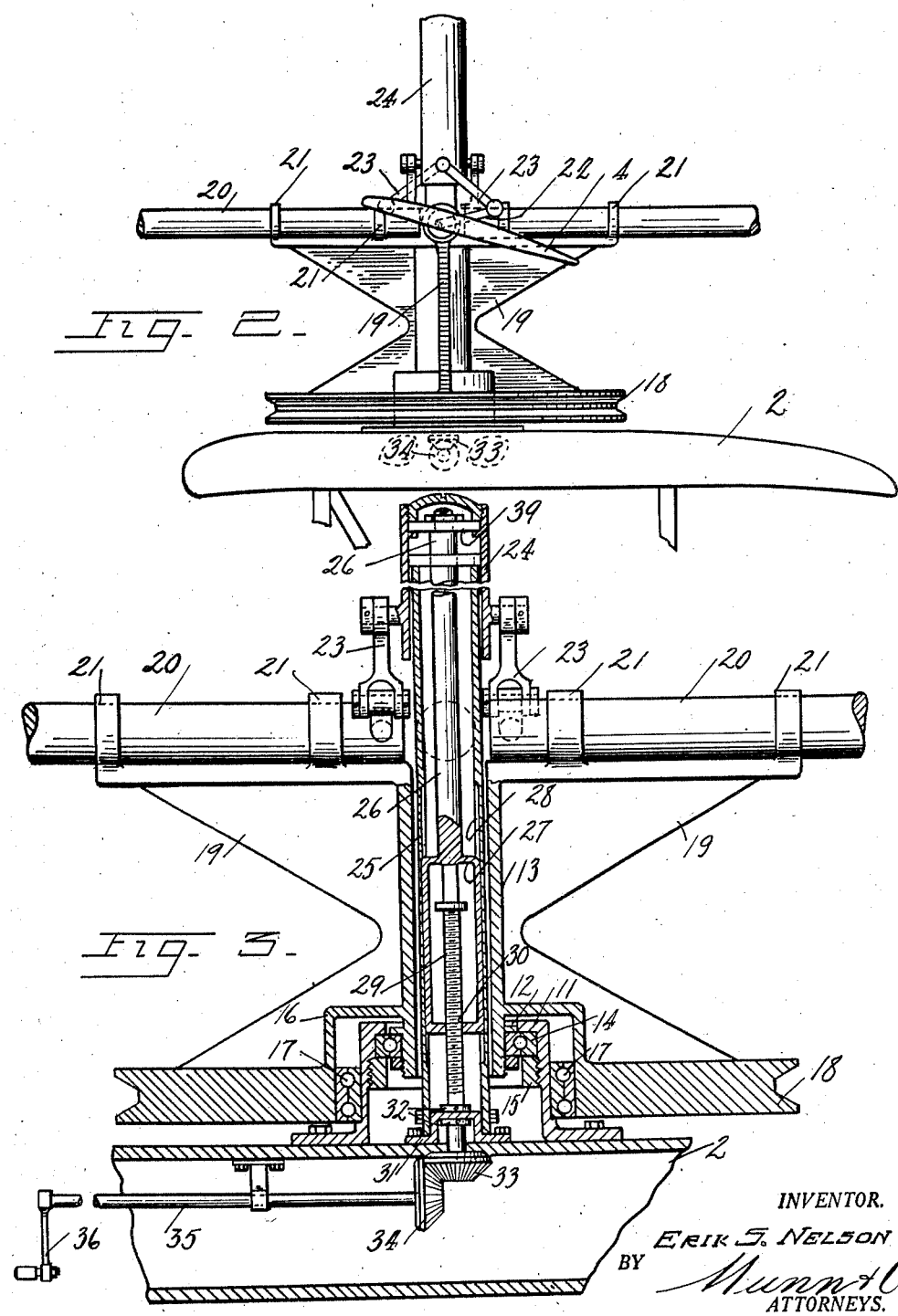
INVENTOR.
ERIK S. NELSON
BY
Munn & Co.
ATTORNEYS.

Patented Feb. 9, 1932

1,844,786

UNITED STATES PATENT OFFICE

ERIK SIGFRID NELSON, OF SAN FRANCISCO, CALIFORNIA

MULTIHELIX

Application filed January 6, 1930. Serial No. 418,917.

My invention relates to improvements in multi-helix, and it consists in the combinations, constructions and arrangements hereinafter described and claimed.

An object of my invention is to provide a multi-helix in which the usual airplane wings are shortened in length and in which a number of propellers are disposed in a horizontal plane, these propellers being provided with blades whose angles may be changed so as to vary the lifting force of the propellers. I am aware of airships known as helicopters, and am also aware of other airships known as autogyros, but neither of these meet the spirit of the present invention because they do not show horizontally disposed variable pitch propellers that may be controlled by the pilot at will.

A further object of my invention is to provide a variable pitch propeller of novel construction which may be mounted upon the upper surface of the airplane wing or upon the fuselage.

Other objects and advantages will appear as the specification proceeds, and the novel features of the device will be particularly pointed out in the claims hereto annexed.

My invention is illustrated in the accompanying drawings, in which:

Figure 2 is a side elevation of one of the variable pitch propellers, and

Figure 3 shows a vertical section through the same device, portions being shown in elevation.

Figure 1:
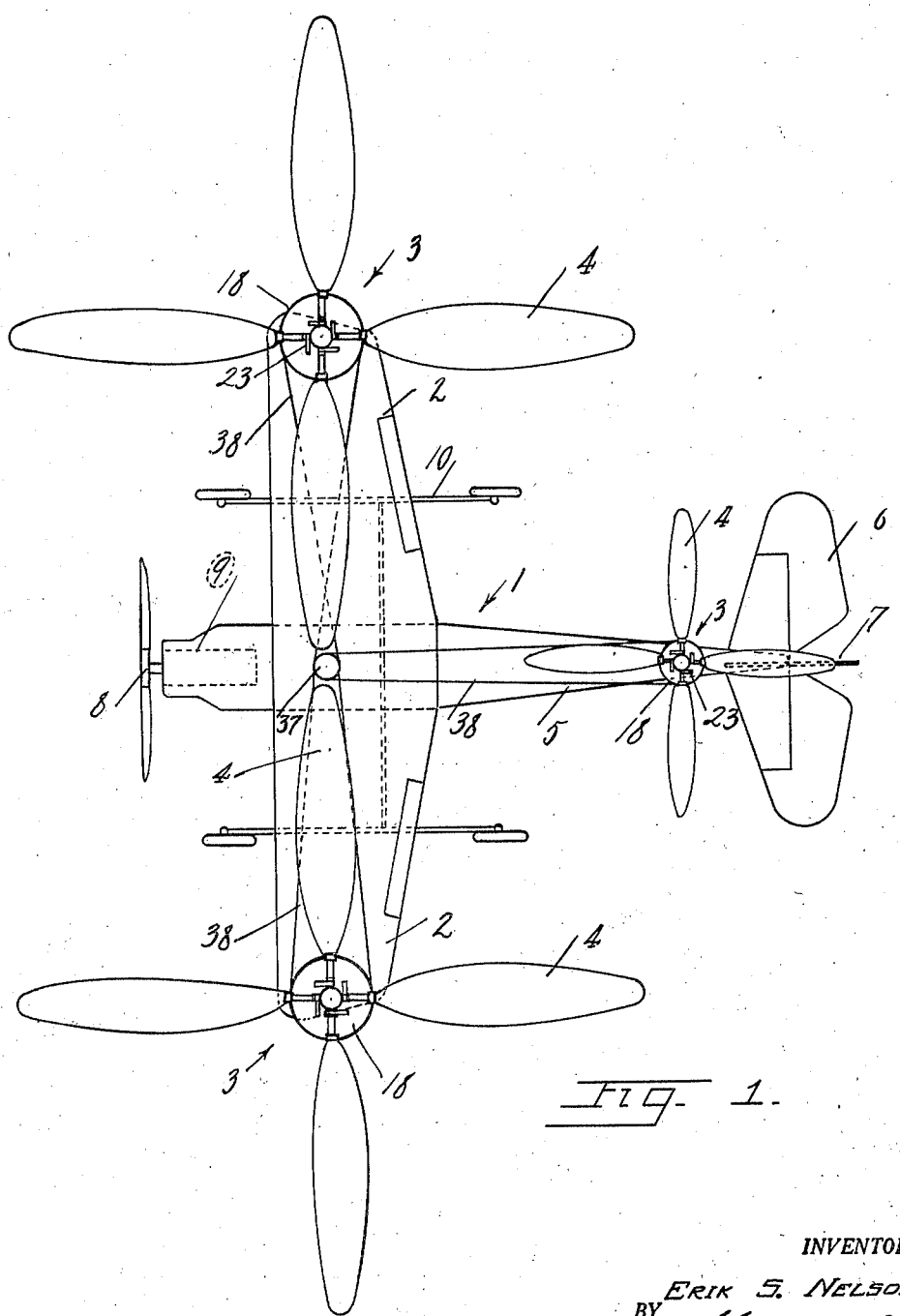
Figure 1 is a top plan view of the device.

In carrying out my invention, I provide an airplane indicated generally at 1 which is substantially standard in appearance but which has wings 2 shorter in length than that usually provided. The extra supporting surface for the airplane consists of a number of variable pitch propellers indicated generally at 3, these propellers having blades 4 that may be swung into different angles at the will of the operator for varying the lifting force exerted upon the airplane. In the present form of the device I have shown one of these propellers being mounted on each wing and a smaller propeller mounted at the rear of the fuselage 5.

The airplane is provided with the usual tail elevators 6 and a rudder 7. At the front of the airplane I mount a standard screw propeller 8, and this is driven by an engine indicated generally at 9. It is obvious that my variable and reversible pitch propeller may be substituted for the screw propeller 8 if desired. Landing gear 10 of a more delicate construction can be employed, because the airplane can descend vertically if desired or can land at a very slow speed.

I will now describe the type of variable pitch propeller used in lifting the airplane. In Figure 3 I show a portion of the wing 2, and it will be noted that I mount a casting 11 on the upper surface of the wing. This casting has an opening 12 in its top, and a sleeve 13 extends through this opening. The sleeve is rotatably connected to the casting 11 by a ball race 14, the ball bearing race in turn being secured to the casting by a screw collar 15.

The sleeve 13 has an outwardly-flared portion 16 that substantially covers the casting 11, and the portion 16 is spaced from the casting by ball bearings 17. The outwardly-flared portion 16 has its lower end fashioned into a pulley 18, and the pulley, outwardly-flared portion 16, and sleeve 13 are reinforced by integral webs 19.

I provide as many webs 19 as there are propeller blades 4. In the present form of the device I have shown four such blades for each propeller. The blades 4 have integral shanks 20 that are rockably mounted in bearings 21, the latter being formed integral with the webs 19. Each shank 20 has an arm 22 extending radially therefrom as shown in Figure 2, and a link 23 connects the free end of the arm 22 with a cap 24 that is slidably mounted on an inner sleeve 25 (see Figure 3). The sleeve 25 extends downwardly through the sleeve 13 and is secured to the top of the wing 2 so as not to rotate with the sleeve 13 and the cap 24. The cap 24 is connected to a rod 26 so as to be movable vertically when the rod 26 is moved vertically. The lower end of the rod is fashioned into a cage-like structure 27 that has four ribs, these ribs being slidably received in grooves 28. The grooves 28 permit the rod 26 to be moved vertically, but prevent the rod from being rotated.

A screw 29 is disposed within the sleeve 25 and passes through a threaded opening 30 in the cage 27. The screw projects through a casting 31 and is prevented from longitudinal movement by collars 32. At the bottom of the screw I mount a bevel gear 33, and this meshes with a second bevel gear 34. A shaft 35 leads from the bevel gear 34 to a crank handle 36, and this handle may be disposed in the cockpit of the airplane if desired where it may be readily actuated by the pilot.

From the foregoing description of the various parts of the device, the operation thereof may be readily understood.

If desired, there may be a separate handle 36 for each variable pitch propeller 3; this permits the blades of each propeller to be separately adjusted as shown in Figure 3, or the front two can be adjusted together and if two rear propellers are used, these may be adjusted together.

Figure 1 shows a driving wheel 37 that is operatively connected to the engine 9 by a means not shown, or it may be independently driven by a separate motor. Belts 38 lead from this driving wheel 37 to the pulleys 18, and in this way the propellers are rotated.

When the pilot wishes to change the angle of the blades, he merely rotates the crank 36 in the desired direction, which in turn rotates the screw 29. This raises or lowers the rod 26, and the rod in turn raises or lowers the cap 24 due to the fact that the rod is connected to the cap by means of a disc 39 that is rotatably secured to the rod and to the cap. The vertical movement of the cap 24 moves the links 23, and these in turn rock the arms 22 for swinging the blades 4 into the desired angular position. The angle of the blades may be relatively steep for lifting the airplane vertically, and after the airplane has attained sufficient height, the blades may be flattened out so as to act as additional wings. The desired course of direction is obtained by the propeller 8 and the rudder 7. In order to have forward flight, the blades of the rear propeller 3 must be disposed at a greater pitch than the blades of the forward horizontal propellers. This prevents the device from turning over backwards. The propeller 8 need not be actuated or in the case of a variable pitch propeller, the blades may be set neutral when the plane is lifted vertically by the horizontal propellers. Also the propellers 3 may be disconnected from the engine for allowing their free movement. This will permit the airplane to gently land. The blades of the horizontal propellers may remain the same size in a large multi-helix as in a small one, because in the large one a greater number of propellers are used.

Although I have shown and described one embodiment of my invention, it is to be understood that the same is susceptible of various changes, and I reserve the right to employ such changes as may come within the scope of the invention as claimed.

I claim:

1. A horizontally disposed variable pitch propeller comprising a tubular support, a sleeve rotatably mounted thereon and having an integral pulley, blade supporting webs extending radially from said sleeve, propeller blades rotatably carried by said webs, a rod slidably and non-rotatably mounted in said support, means for moving said rod, a cap rotatably secured to the slide and being movable along its axis when the rod is moved, and connections between the cap and the blades for changing the pitch of the blades during the rotation of the sleeve.

2. A horizontally disposed variable pitch propeller comprising a tubular support, a sleeve rotatably mounted thereon and having an integral pulley, webs extending radially from said sleeve, propeller blades rotatably carried by said sleeve, a rod slidably and non-rotatably mounted in said support, means for moving said rod, a cap rotatably secured to the rod and being movable along its axis when the rod is moved, and connections between the cap and the blades for changing the pitch of the blades during the rotation of the sleeve.

3. A variable pitch propeller comprising a tubular support, a sleeve rotatably mounted thereon, propeller blades rotatably carried by said sleeve, a non-rotatable rod disposed in said tubular member, means for moving the rod in the direction of its length, connections between the rod and the blades for changing the pitch of the blades when the rod is moved and irrespective of the rotation of the sleeve, a support for said sleeve enclosing its lower end, a cylindrical projection carried by the sleeve and enclosing the support, and bearings disposed between the support and the sleeve and between the support and the projection.

ERIK SIGFRID NELSON.